United States Patent [19]

Huber

[11] 3,918,757
[45] Nov. 11, 1975

[54] WEED PULLER

[76] Inventor: Frank J. Huber, 6840 S.W. 8th St. Apt. F613, Miami, Fla. 33144

[22] Filed: Feb. 11, 1974

[21] Appl. No.: 441,414

[52] U.S. Cl............................. 294/50.9; 294/103 R
[51] Int. Cl.².......................................... A01B 1/18
[58] Field of Search............ 294/11, 19 R, 34, 50.8, 294/50.9, 61, 100, 103, 104, 115; 56/400.18, 400.19

[56] References Cited
UNITED STATES PATENTS

| 661,790 | 11/1900 | Childers..................... 56/400.19 X |
| 938,651 | 11/1909 | Doughty............................ 294/50.8 |
| 1,820,463 | 8/1931 | Klein................................... 294/11 |
| 2,125,214 | 7/1938 | Apfel et al............................ 294/11 |
| 2,436,500 | 2/1948 | Anderson.......................... 294/50.8 |
| 2,579,536 | 12/1951 | Barr.............................. 294/19 R X |
| 2,882,085 | 4/1959 | Abbott.............................. 294/50.9 |
| 2,905,498 | 9/1959 | Lunde............................... 294/19 R |
| 3,032,367 | 5/1962 | Thurston........................ 294/103 R |
| 3,225,838 | 12/1965 | Gotzinger..................... 294/50.8 X |

Primary Examiner—Evon C. Blunk
Assistant Examiner—Johnny D. Cherry
Attorney, Agent, or Firm—Malin & Haley

[57] ABSTRACT

A weed puller having a shaft, a pair of raking prongs parallely disposed at one end of said shaft, and a weed grasping plate which is moveably disposed on said shaft to be received in contact with said raking prongs in a first position, said plate being actuated by a biased linkage mechanism adjacent the upper holding portion of the shaft. The inner edges of the raking prongs are flat and receive the plate flushly, thus providing for positive gripping action upon a weed that is disposed against the prongs. This allows for a positive grip of the weed body to allow the weed to be pulled without tearing the weed so that the roots are pulled during the weed pulling operation.

1 Claim, 7 Drawing Figures

WEED PULLER

BACKGROUND OF THE INVENTION

This invention relates generally to a mechanical device for pulling weeds which are found in lawns, gardens or the like and more specifically to a weed pulling device which may be manually actuated from a standing position and which provides for a positive gripping action on the weed itself to insure that the entire weed including the root structure may be manually pulled out from the earth or soil.

The prior art shows several different weed pullers that are disposed on a shaft and are manually actuated by a linkage mechanism. However, the problems with many of these devices are that they are extremely complicated in structure and that they cut the weed while pulling it from the ground, thus leaving the root structure in the ground, an undesirable characteristic. Applicant's invention overcomes these problems by providing a weed puller having a weed grasping means in which the weed body is received against a pair of rake-like prongs having flat edge portions which engage a flat plate. The weed is firmly grasped between the prong edges and the plate so that the weed body will not be cut during removal from the ground. The raking prongs allow for loosening the soil on each side of the weed and may be adjustable as to their lateral separation making Applicant's device adjustable for weeds of various sizes.

BRIEF DESCRIPTION OF THE INVENTION

A weed puller comprising an elongated shaft, a pair of rake-like prongs extendibly connected at one end of said shaft, a linkage arm disposed parallel and moveably connected to said shaft, a plate disposed substantially perpendicular to said shaft, said plate connected to one end of said linkage arm, said plate moveable from a first position away from said rake-like prongs to a second position engaged against said rake-like prongs. Each prong has a flat edge portion which flushly engages a portion of the plate surface. The shaft includes a hollow tube, with the linkage arm disposed substantially within the hollow tube, but having an extended end portion outside of said shaft which is connected to said plate.

The prongs are sufficiently resilient to allow lateral separation adjustment by movement of a prong. A connector, such as a bolt and nut, is connected between and through the prongs.

In operation, the weed puller is placed adjacent the weed that is desired to be pulled. The raking prongs may be engaged to the earth to dig on each side of the weed. The linkage arm is then mechanically actuated to move the plate against the rake-prongs thereby engaging the weed between the plate surface and the rake prong surfaces. The weed is then pulled firmly from the ground by a lifting motion without cutting the weed body.

It is an object of this invention to provide an improved weed pulling device which allows for the pulling of the weed including the root structure.

It is another object of this invention to provide an improved weed puller having a weed engaging means which is adjustable in size to accomodate various sized weeds.

And still yet another object of this invention is to provide an improved weed puller which includes a raking means to allow for the digging about the weed which is utilized in conjunction with the weed grasping means itself.

In accordance with these and other objects which will be apparent hereinafter, the instant invention will now be described with particular reference to the accompanying drawings.

PREFERRED EMBODIMENT OF THE INVENTION

Figure 1:
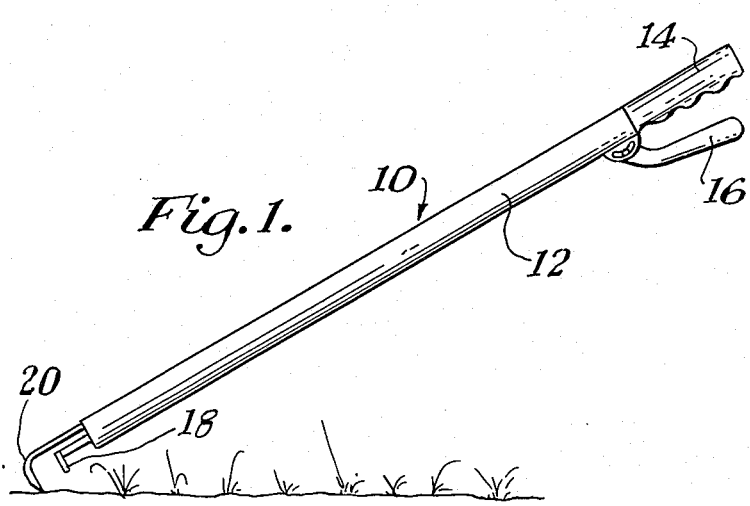
FIG. 1 shows a side elevational view of Applicant's invention.

Referring now to the drawings particularly FIG. 1, Applicant's improved weed puller is shown generally at 10, comprising a rigid hollow shaft 12 having connected at one end a handle 14 and a lever 16 pivotally attached to the shaft 12 disposed adjacent handle 14. Connected at the opposite end of the shaft 12 are a pair of L-shaped raking prongs 20 which extend from the end of shaft 12. A weed grasping plate 18 is moveably disposed from the end of shaft 12 (discussed below).

Figure 2A:
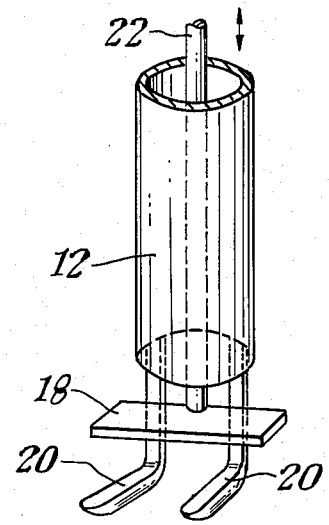
FIG. 2A shows a fragmentary perspective view of the weed grasping mechanism utilized in Applicant's invention in a first position.

FIG. 2A shows the weed engaging and grasping mechanism which includes a pair of rake prongs 20 extendibly connected to the end of shaft 12, through which is received linkage arm 22 rigidly connected perpendicularly to the weed grasping plate 18. The linkage mechanism is resiliently held in this position when the device is not in operation so that the plate 18 in the unactuated position is above and out of engagement with the raking prongs 20.

Figure 2B:
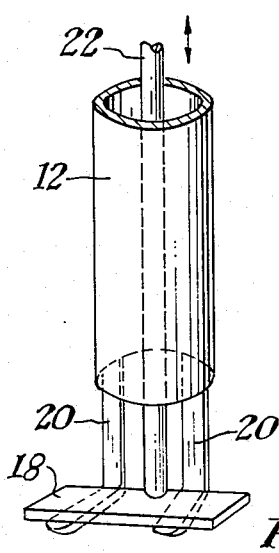
FIG. 2B shows a fragmentary perspective view as in FIG. 2A except that the weed grasping plate is in the second position against the inner edges of the prongs.

In FIG. 2B, the plate is shown in the actuated position when the lever (FIG. 1) is moved against a spring mechanism which forces linkage arm 22 along the axis of the shaft, longitudinally, toward the raking prongs 20 thus forcing the plate 18 into a flush engagement against the inner faces of the raking prongs 20.

Figure 3:
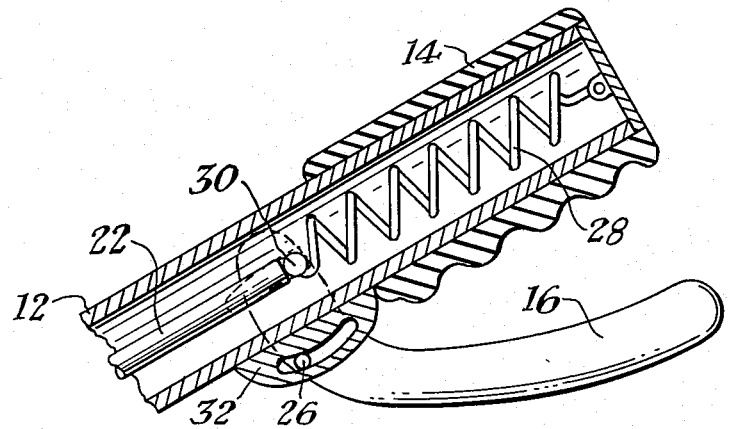
FIG. 3 shows the manual actuating mechanism in a fragmentary side elevational view which manually actuates the linkage mechanism for the operation of Applicant's device.

FIG. 3 shows the actuating mechanism of Applicant's device which is accomplished by manually rotating lever 16 which pivots about pin 26 connected through an elliptical slot in shaft flange 32, thus rotatably connecting the lever to the shaft, the lever 16 at its one end adjacent the pivot point being moveably connected by pin 30 to the linkage arm 22. The pivot pin 30 is also connected to a spring 28 anchored in the handle portion of the shaft to bias and resiliently hold the linkage arm in an up position.

Figure 4:
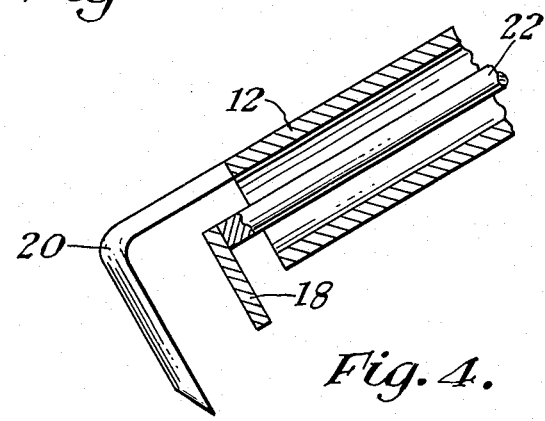
FIG. 4 shows a fragmentary elevational cross-sectional view of the weed grasping mechanism and linkage utilized in Applicant's invention.

FIG. 4 shows the weed grasping mechanism including a weed grasping plate 18 which is connected to the end of linkage arm 22 extending from the shaft 12. When the linkage arm 22 is manually actuated, forcing the linkage arm 22 in the direction of the raking prongs 20, the plate 18 moves into engagement with the upper, inner surface of the raking prongs 20 which are substantially flat.

Figure 5:
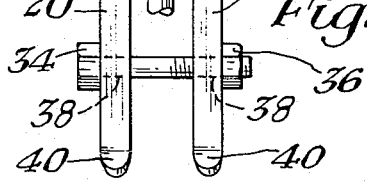
FIG. 5 shows a front cross-sectional view of the raking prongs and weed grasping plate in engagement.

FIG. 5 shows the engagement of the plate 18 against the raking prongs 20, such that the weed surface disposed therein will not be cut but will be grasped firmly between plate surface portions and the raking prongs 20. This will insure that the weed is not cut but provides a contact area against the weed surface to allow for pulling of the weed so that the root structure is removed from the ground.

Figure 6:
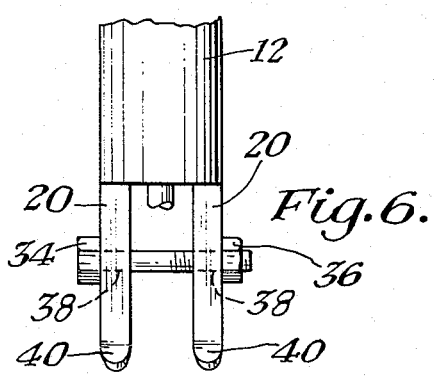
FIG. 6 shows a front elevational view of an alternate embodiment of Applicant's invention.

FIG. 6 shows an alternate embodiment of Applicant's invention in which the raking prongs 20 are adjustable as to the separation between each one by movement of bolt 34 which is received through apertures 38 in prongs 20 and nut 36. The bolt 34 and nut 36 may be tightened or loosened to reduce or increase the prong separation respectively. Of course, other ways of connecting the prongs together could be utilized, including sliding collars or the like and likewise the prongs may be divergently disposed for increased separation adjustment.

FIG. 6 also shows the upper perpendicular surface portion 40 of prongs 20 as being flat to flushly engage plate 18 (not shown in FIG. 6 for clarity).

To operate Applicant's device (FIG. 1) the device is grasped manually and positioned adjacent a weed to be pulled. The raking prongs having spiked end tips are dug into the ground so that prongs are on each side of the weed to be pulled. The lever is then manually actuated driving the plate into engagement with the weed, pressing and forcing the weed body against the plate surfaces and the prongs. The shaft is pulled upward which will pull the weed from the ground without cutting the weed.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. An improved weed puller comprising:
   an elongated rigid hollow shaft having a first end and an opposite end;
   a handle connected to said shaft first end;
   a linkage arm disposed substantially inside said hollow shaft, resiliently connected at one end to said first end of said shaft, said linkage arm having a short protruding portion disposed outside of said shaft opposite end;
   at least two parallely disposed, separated, L-shaped prongs connected to said opposite end of said shaft, said prongs being substantially perpendicular to the longitudinal axis of said shaft;
   a flat, rigid plate perpendicularly connected to the end of said linkage arm protruding from said inside of said shaft;
   a lever pivotally connected to the first end of said shaft adjacent said handle and connected to said linkage arm for moving said linkage arm;
   a spring resiliently connecting said linkage arm to the first end of said shaft, said spring being disposed within said shaft; and
   a means for moveably adjusting the distance separating said prongs, said prongs having surface portions facing said flat plate which are substantially flat whereby pivoting said lever moves said linkage arm from the first position out of engagement with said flat pronged surface portions to a second position in engagement with the flat portion of said prongs.

* * * * *